(12) United States Patent
Zhang et al.

(10) Patent No.: US 11,363,637 B2
(45) Date of Patent: Jun. 14, 2022

(54) METHOD AND DEVICE FOR PROVIDING INDICATION OF PHYSICAL RESOURCE USED FOR RANDOM ACCESS, AND STORAGE MEDIUM

(71) Applicant: ZTE Corporation, Guangdong (CN)

(72) Inventors: Junfeng Zhang, Guangdong (CN); Peng Hao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/569,509

(22) Filed: Sep. 12, 2019

(65) Prior Publication Data

US 2020/0045746 A1 Feb. 6, 2020

Related U.S. Application Data

(63) Continuation of application No. PCT/CN2018/080247, filed on Mar. 23, 2018.

(30) Foreign Application Priority Data

Mar. 27, 2017 (CN) .......................... 201710189324.8

(51) Int. Cl.
*H04W 74/08* (2009.01)
*H04L 41/0806* (2022.01)
(Continued)

(52) U.S. Cl.
CPC ..... *H04W 74/0833* (2013.01); *H04L 41/0806* (2013.01); *H04W 56/001* (2013.01); *H04W 72/005* (2013.01); *H04W 72/0446* (2013.01)

(58) Field of Classification Search
CPC .......... H04W 72/005; H04W 72/0446; H04W 72/0466; H04W 72/073; H04W 74/0833; H04W 74/0866; H04W 74/0808; H04W 56/001; H04W 56/0005; H04W 56/0035; H04W 56/0055; H04L 41/0806; H04L 41/0813; H04L 41/0823; H04L 41/084
(Continued)

(56) References Cited

U.S. PATENT DOCUMENTS 10,034,121 B2 7/2018 Harsha et al.
2010/0135274 A1 6/2010 Hong et al.
(Continued)

FOREIGN PATENT DOCUMENTS

CN 101378595 A 3/2009
CN 101420265 A 4/2009
(Continued)

OTHER PUBLICATIONS

International Search Report and Written Opinion dated Jun. 21, 2018 for International Application No. PCT/CN2018/080247, filed on Mar. 23, 2018 (8 pages).
(Continued)

*Primary Examiner* — Phong La
(74) *Attorney, Agent, or Firm* — Perkins Coie LLP

(57) ABSTRACT

Disclosed is a method and device for indicating a random access physical resource, which may include: semi-statically configuring an internal structure of a random access slot through a broadcast channel. A computer-readable storage medium is further provided in the present disclosure.

22 Claims, 7 Drawing Sheets

An internal structure of a random access slot is semi-statically configured through a broadcast channel — 101

A terminal is notified of an association relationship between a downlink synchronization signal block or a reference signal and a first random access slot through a system message — 102

(51) Int. Cl.
  *H04W 56/00*  (2009.01)
  *H04W 72/00*  (2009.01)
  *H04W 72/04*  (2009.01)

(58) Field of Classification Search
  USPC .......................................................... 370/254
  See application file for complete search history.

(56) References Cited

U.S. PATENT DOCUMENTS

| | | | |
|---|---|---|---|
| 2011/0098035 A1 | 4/2011 | Frenger et al. | |
| 2014/0328258 A1 | 11/2014 | Cheng et al. | |
| 2014/0348051 A1 | 11/2014 | Park et al. | |
| 2016/0219570 A1 | 7/2016 | Guo et al. | |
| 2017/0251460 A1* | 8/2017 | Agiwal | H04W 72/0406 |
| 2018/0020441 A1* | 1/2018 | Lo | H04W 72/044 |
| 2018/0167979 A1 | 6/2018 | Guo et al. | |
| 2018/0192384 A1* | 7/2018 | Chou | H04W 74/0833 |
| 2018/0220450 A1* | 8/2018 | Aiba | H04W 72/0446 |
| 2018/0262313 A1* | 9/2018 | Nam | H04L 5/005 |
| 2018/0279380 A1* | 9/2018 | Jung | H04W 74/0833 |
| 2019/0254077 A1* | 8/2019 | Sahlin | H04L 5/0037 |
| 2019/0327764 A1* | 10/2019 | Yoo | H04L 1/18 |
| 2019/0350010 A1* | 11/2019 | Guo | H04W 74/004 |
| 2019/0387441 A1* | 12/2019 | Koskela | H04W 36/30 |
| 2020/0036430 A1* | 1/2020 | Kim | H04B 7/088 |
| 2020/0037297 A1* | 1/2020 | Pan | H04W 16/28 |
| 2020/0329466 A1* | 10/2020 | Yoo | H04L 5/0053 |

FOREIGN PATENT DOCUMENTS

| | | |
|---|---|---|
| CN | 101425845 A | 5/2009 |
| CN | 103716895 A | 4/2014 |
| CN | 104412519 A | 3/2015 |
| CN | 104956606 A | 9/2015 |
| EP | 3032910 A1 | 6/2016 |
| KR | 10-2014-0136630 | 12/2014 |
| WO | 2014/116928 A1 | 7/2014 |
| WO | 2014/189286 A1 | 11/2014 |
| WO | 2015/147717 A1 | 10/2015 |
| WO | 2016/086144 A1 | 6/2016 |
| WO | 2017/011802 A1 | 1/2017 |

OTHER PUBLICATIONS

CATT, "Further details on NR 4-step RA Procedure," 3GPP TSG RAN WG1 Meeting #88, Athens, Greece, R1-1702066, 6 pages, Feb. 2017.

Chinese Office Action dated Jul. 22, 2020 for Chinese Patent Application No. 201710189324.8, filed on Mar. 27, 2017 (22 pages).
Chinese Office Action dated Oct. 16, 2020 for Chinese Patent Application No. 201710189324.8, filed on Mar. 27, 2017 (43 pages).
Extended Search Report dated Mar. 11, 2020 for European Application No. 18776632.4, filed on Mar. 23, 2018 (7 pages).
Huawei et al. "RACH Procedures and Resource Configuration," 3GPP TSG RAN WG1 Meeting #88, Athens, Greece, R1-1701724, 7 pages, Feb. 2017.
Korean Office Action dated Nov. 6, 2020 for Korean Patent Application No. 10-2019-7031769, filed on Mar. 23, 2018 (10 pages).
Japanese Office Action dated Nov. 4, 2020 for Japanese Patent Application No. 2019-552848, filed on Mar. 23, 2018 (9 pages).
LG Electronics, "Discussion multi-TRP operation considering analog beamforming," 3GPP TSG RAN WG1 Meeting #87, Reno, Nevada, U.S.A., R1-1611793, 6 pages, Nov. 2016.
Media Tek Inc., "Discussion on multi-beam RAR window design," 3GPP TSG RAN WG1 Meeting #88bis, Spokane, Washington, U.S.A., R1-1704464, 4 page, Apr. 2017.
Samsung, "NR 4-step random access procedure," 3GPP TSG RAN WG1 NR Ad Hoc, Spokane, Washington, U.S.A., R1-1700891, 14 pages, Jan. 2017.
ZTE Corporation et al., "Random access preamble structure and signaling," 3GPP TSG RAN WG1 Meeting #87, Reno, Nevada, U.S.A., R1-1611271, 6 pages, Nov. 2016.
Japanese Office Action dated May 11, 2021 for Japanese Patent Application No. 2019-52848, filed on Mar. 23, 2018 (6 pages).
NTT DoCoMo, Inc. "NR PRACH design," 3GPP TSG RAN WG1 #88, Athens, Greece, R1-1702830, 10 pages, Feb. 17, 2017.
Qualcomm Incorporated, "2-step RACH procedure consideration," 3GPP TSG-RAN WG1 NR AdHoc, Spokane, Washington, USA, R1-1700792, 7 pages, Jan. 20, 2017.
European Office Action dated Aug. 4, 2021 for European Patent Application No., filed 18 77 6632.4 on Mar. 23, 2018 (7 pages).
Korean Notice of Allowance dated May 17, 2021 for Korean Patem Application No. 10-2019-7031769, filed on Mar. 23, 2018 (6 pages).
Chinese Office Action dated Jan. 18, 2021 for Chinese Patent Application No. 201710189324.8, filed on Mar. 27, 2017 (14 pages).
Indian First Examination Report dated Mar. 30, 2021 for Indian Patent Application No. 201937037901, filed on Sep. 19, 2019 (6 pages).
Chinese Notification of Reexamination dated Oct. 28, 2021 for Chinese Patent Application No. 201710189324.8, filed on Mar. 27, 2017 (13 pages).
Japanese Office Action dated Dec. 14, 2021 for Japanese Patent Application No. 2019-552848, filed on Mar. 23, 2018 (5 pages).

* cited by examiner

METHOD AND DEVICE FOR PROVIDING INDICATION OF PHYSICAL RESOURCE USED FOR RANDOM ACCESS, AND STORAGE MEDIUM

CROSS REFERENCE TO RELATED APPLICATIONS

This patent document is a continuation of and claims the benefit of priority to International Patent Application No. PCT/CN2018/080247, filed on Mar. 23, 2018, which claims the benefit of priority to Chinese Patent Application No. 201710189324.8, filed on Mar. 27, 2017. The entire contents of the before-mentioned patent applications are incorporated by reference as part of the disclosure of this application.

TECHNICAL FIELD

The present invention relates to the field of wireless communications, and specifically relates to a method and a device for indicating a random access physical resource, and a storage medium thereof.

BACKGROUND

In the new generation mobile communications system, system networking will be performed on carrier frequencies higher than those used in 2G, 3G, and 4G systems. Currently, the frequency bands widely recognized by the industry and identified by international organizations are mainly 3 GHz to 6 GHz, and 6 GHz to 100 GHz. With respect to networking frequencies of early communications systems, these frequency bands are relatively high, have greater loss in propagation, and have a relatively smaller coverage radius under the same power. This also determines that the beamforming technology needs to be adopted for increasing the coverage radius in the networking of the new generation mobile communications system. The initial access has higher requirements for coverage, and requires a coverage range greater than that required by the service. The beamforming technology is even more essential.

For the new generation mobile communications system in which beamforming is widely used, one beam cannot completely cover an entire cell, and a plurality of beams are needed to cover the entire cell or a sector in the traditional sense. If the plurality of beams cannot be transmitted at the same time, a process of beam scanning in the time dimension is required to cover the entire cell or sector. For downlink common signals or channels such as synchronization signals, broadcast channels, common control channels, common traffic channels, etc., a seamless coverage of the entire cell needs to be ensured, and the beam is required to meet the coverage requirement. When the plurality of beams cannot be transmitted at the same time, a complete process of beam scanning must be gone through so that the corresponding common signals or common information can be read by terminals at all possible positions in the cell. After reading the random access configuration message carried by the common signal or the common information, the terminal may initiate random access according to the random access physical resource notified in the random access configuration message. At this time, if the base station needs to transmit a message to the terminal, which beam is a preferred beam that can successfully transmit information to the terminal is at least required to be known since a single beam cannot cover the entire cell. A technical solution is not provided in the related art. If the base station randomly selects one beam or transmits a message to a specific terminal in all beams, this causes a wrong selection of a beam by the base station so that the terminal fails to receive the message, or a waste of beam resources because of a use of all beams to transmit the message to a specific terminal.

SUMMARY

The present invention provides a method and a device for indicating a random access physical resource, and a storage medium thereof, in hope of at least partially solving the above-mentioned problem.

In a first aspect, the present disclosure provides a method for indicating a random access physical resource, including:

semi-statically configuring an internal structure of a random access slot through a broadcast channel.

In a second aspect, the present disclosure provides a device for indicating a random access physical resource, including:

a first configuration module, which is configured to semi-statically configure an internal structure of a random access slot through a broadcast channel.

In a third aspect, the present disclosure provides a device for indicating a random access physical resource, including a processor and a memory, where the memory stores computer-executable instructions which, when executed by the processor, may implement any method for indicating a random access physical resource provided in the first aspect.

In a fourth aspect, the present disclosure provides a method for indicating a random access physical resource, including:

receiving an internal structure of a random access slot semi-statically configured by a base station or a transmission-reception point (TRP) through a broadcast channel;

determining a random access slot in use according to an association relationship between a downlink synchronization signal block or a reference signal from the base station or the transmission-reception point and a first random access slot; and transmitting a random access signal on the determined random access slot or on a part of the random access slot.

In a fifth aspect, the present disclosure provides a device for indicating a random access physical resource, including:

a second receiving module, which is configured to receive an internal structure of a random access slot semi-statically configured by a base station or a transmission-reception point (TRP) through a broadcast channel;

a second determining module, which is configured to determine a random access slot in use according to an association relationship between a downlink synchronization signal block or a reference signal from the base station or the transmission-reception point and a first random access slot; and a second transmitting module, which is configured to transmit a random access signal on the determined random access slot or on a part of the random access slot.

In a sixth aspect, the present disclosure provides a device for indicating a random access physical resource, including a processor and a memory, where the memory stores computer-executable instructions which, when executed by the processor, implement any method for indicating a random access physical resource provided in the fourth aspect.

In a seventh aspect, the present disclosure further provides a computer-readable storage medium which stores computer-executable instructions; and after executed, the computer-executable instructions can implement any of the method for indicating a random access physical resource provided in the first aspect or the fourth aspect.

For the method and device for indicating a random access physical resource and the storage medium thereof in the present invention, the base station configures the internal structure of the random access slot through the broadcast channel. If the internal structure of such a random access slot is known by the terminal (e.g., user equipment (UE)) in advance, the UE may transmit a random access request in a corresponding random access slot once a beam is detected by the UE itself, such that after the random access request is received by the base station, the base station knows which beam is detected by the terminal, and then successfully transmits information to the terminal by using the beam. For example, the association relationship between the downlink synchronization signal block or the reference signal and the first random access slot is notified through a system message according to the internal structure of the random access slot. Since the downlink synchronization signal block or the reference signal is transmitted by the beam, if the terminal detects a certain synchronization signal block or reference signal or detects the synchronization signal block or the reference signal with the best received signal quality, the first random access physical resource is determined according to the association relationship, and a random access request is transmitted on the first random access physical resource, the base station may determine which beam may be detected by the terminal or that the beam with the highest received signal strength is detected by the terminal according to the random access physical resource where the random access request transmitted currently by the terminal is located. If the beam determined by this method is used to transmit information to the terminal, the information has a higher probability of being successfully received by the terminal. Obviously the problem that which beam transmits the information to the specific terminal cannot be determined by the terminal in the related art is solved. At the same time, by adopting a beam determined in such a manner to transmit information, the probability that the terminal successfully receives the information transmitted by the base station may be improved.

BRIEF DESCRIPTION OF DRAWINGS

The drawings are used to provide a further understanding of the technical solutions of the present invention, constitute a part of the specification, explain the technical solutions of the present invention in conjunction with the embodiments and examples of the present disclosure, and do not limit the technical solutions of the present invention.

DETAILED DESCRIPTION

Objects, technical solutions and advantages of the present invention will be clearer from a detailed description of embodiments of the present invention in conjunction with the drawings. It should be noted that if not in collision, the embodiments and features therein in the present disclosure may be combined with each other.

The steps illustrated in the flowcharts of the drawings may be executed by, for example, a set of computer-executable instructions in a computer system. Moreover, although the flowcharts illustrate a logical order of execution, the steps illustrated or described may, in some cases, be executed in an order different from that herein.

A study found that random access physical resources are common resources for all beams, and no subset of random access physical resources is specifically configured for a certain beam. The advantage is that the random access physical resources are a large resource pool for all beams, the resource selection range is larger, and the collision probability of random access can be reduced when the access density is not high, while the disadvantage is also obvious. No resource subset for a specific beam direction exists, and it is difficult for the base station to determine the downlink beam preferred by the terminal through the resource selected by the terminal. Therefore, in the embodiments, the base station will notify to configure an internal structure of the random access resource, and after the internal structure is known by the terminal, the terminal selects a random access resource and transmits a random access request according to the internal structure and the beam detected by the terminal itself. For example, the terminal will obtain the association relationship between a downlink synchronization signal block or a reference signal and the first random access slot, and the downlink synchronization signal block or the reference signal has a corresponding relationship with a specific beam. Thus, if the terminal chooses to initiate random access on the first random access slot, the beam that may be successfully detected by the terminal may be easily determined by the terminal, so that which beam is used to transmit the information to the terminal is determined. Thereby, the success rate of transmitting information to the terminal is improved.

Embodiment 1

Figure 1:
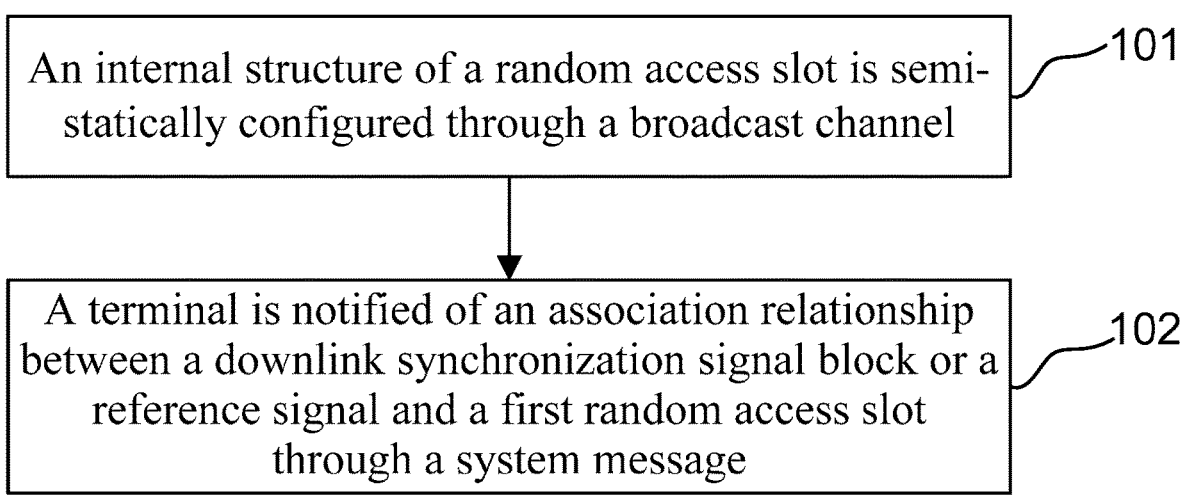
FIG. 1 is a flowchart of a method for indicating a random access physical resource according to an embodiment 1 of the present invention.
Figure 2:
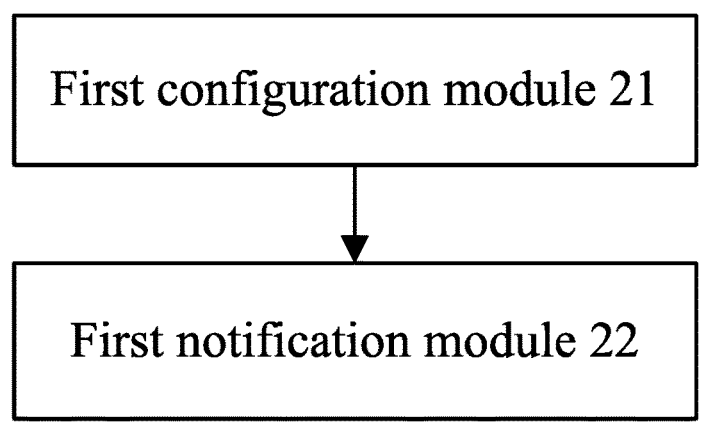
FIG. 2 is a structural diagram of a device for indicating a random access physical resource according to the embodiment 1 of the present invention.

As shown in FIG. 1, a method for indicating a random access physical resource is provided and may include the steps described below.

In a step 101, an internal structure of a random access slot is semi-statically configured through a broadcast channel.

In a step 102, a terminal is notified of an association relationship between a downlink synchronization signal block or a reference signal and a first random access slot through a system message.

The step 101 may include: determining the internal structure of the random access slot, and semi-statically broadcasting the internal structure of the random access slot through the broadcast channel. In this way, the internal structure of the random access slot configured by a base station may be received by the terminal on the broadcast channel. The base station semi-statically broadcasts the internal structure of the random access slot, that is, in a semi-static period corresponding to every other semi-static period, the base station broadcasts the internal structure of the random access slot once through the broadcast channel.

The step 102 may include: determining an association relationship between the downlink synchronization signal block and the first random access slot, and/or determining an association relationship between the reference signal and the first random access slot according to the internal structure of the random access slot, and notifying the terminal of the determined association relationship through the system message.

In practical application, a plurality of random access slots may be involved in the association relationship between the downlink synchronization signal block or the reference signal and the random access slot, and N random access slots may be provided (as described below). The first random access slot in the embodiment represents the first slot of the plurality of random access slots, and the random access slots may be fully expressed by the starting point plus the number. Optionally, the number N may be separately notified, and the first random access slot may also be separately notified.

In an implementation mode, the internal structure of the random access slot may at least include one of:

a ratio of a downlink part to an uplink part in the random access slot;

the number of symbols occupied by random access of the uplink part in the random access slot;

a time length of a random access physical resource of the uplink part in the random access slot; and the number of random access channel (RACH) occasions for the uplink part in the random access slot.

In an implementation mode, the internal structure of the random access slot is a slot in which the downlink part is dominant or a slot in which the uplink part is dominant.

In an implementation mode, the internal structure of the random access slot is configured according to a random access preamble format. For example, the internal structure of the random access slot is configured according to a random access preamble format that needs to be supported.

In an implementation mode, in the time domain, the association relationship between the downlink synchronization signal block or the reference signal and the first random access slot may be that: the k-th random access slot after the downlink synchronization signal block or the reference signal is the first random access slot, where k is a positive integer.

In another implementation mode, in the time domain, the association relationship between the downlink synchronization signal block or the reference signal and the first random access slot may be: the association relationship between the downlink synchronization signal block or the reference signal and the first random access slot is related to an index of the downlink synchronization signal block or the reference signal in the time domain. For example, the random access slot may select the same index of the downlink synchronization signal block or the reference signal, or the random access slot may be obtained by performing function calculation on the index of the downlink synchronization signal block or the reference signal. Here, the index may be an index number.

In an implementation mode, the method further includes: determining an association relationship between the synchronization signal block or the reference signal and N random access slots, and notifying the terminal in an explicit or implicit manner, where N is an integer greater than or equal to 1 or a fraction greater than 0 and less than 1. In practical application, no clear sequence exists for the determination and notification of the association relationship between the synchronization signal block or the reference signal and N random access slots to the terminal practical application and the notification of the association relationship between the synchronization signal block or the reference signal and the first random access slot in the embodiment. Here, if the terminal is notified in the explicit manner, the notification is implemented through a clear information indication. If the terminal is notified in the implicit manner, the method may include: a corresponding relationship between a certain message or signal and an association relationship is established in advance, and then the message or signal is transmitted. The association relationship is not explicitly indicated, but the terminal may determine the indicated association relationship according to the above-mentioned corresponding relationship.

In an implementation mode, the number N may be determined by at least one of the following configurations or any combination thereof:

random access channel preamble format;

random access slot configuration; and a length of a random access signal.

In an implementation mode, the step in which the internal structure of the random access slot is semi-statically configured through the broadcast channel includes one of the steps described below.

The association relationship between every synchronization signal block or reference signal in the synchronization signal burst set and the respective corresponding first random access slot is the same.

Each of the synchronization signal blocks or reference signals in the synchronization signal burst set has an association relationship respectively configured.

In an implementation mode, each of the random access slots provides one or more frequency domain resources as random access time-frequency resources.

The above-mentioned method of the embodiment may be implemented through a base station, a transmission-reception point (TRP), or other similar devices. As shown in FIG.

2, a device for indicating a random access physical resource is provided and includes a first configuration module 21 and a first notification module 22.

The first configuration module 21 is configured to semi-statically configure an internal structure of a random access slot through a broadcast channel.

The first notification module 22 is configured to notify a terminal of an association relationship between a downlink synchronization signal block or a reference signal and a first random access slot through a system message. For example, the first notification module 22 may be configured to notify the terminal of an association relationship between the downlink synchronization signal block or the reference signal and the first random access slot through the system message according to an internal structure of a random access slot.

In an implementation mode, the internal structure of the random access slot at least includes one of:

a ratio of a downlink part to an uplink part in the random access slot;

the number of symbols occupied by random access of the uplink part in the random access slot; and a time length of a random access physical resource of the uplink part in the random access slot.

In an implementation mode, the internal structure of the random access slot is a slot in which the downlink part is dominant or a slot in which the uplink part is dominant.

In an implementation mode, the first configuration module 21 may be configured to set the internal structure of the random access slot according to a random access preamble format that needs to be supported.

In an implementation mode, the first configuration module 21 may further be configured to determine the association relationship between the downlink synchronization signal block or the reference signal and the first random access slot in the time domain as that: the k-th random access slot after the downlink synchronization signal block or the reference signal is the first random access slot, where k is a positive integer.

In an implementation mode, the first configuration module 21 may further be configured to determine an association between the downlink synchronization signal block or the reference signal and N random access slots; and the first notification module 22 may be further configured to notify the terminal of the association between the downlink synchronization signal block or the reference signal and N random access slots in an explicit or implicit manner, where N is an integer greater than or equal to 1 or a fraction greater than 0 and less than 1.

In an implementation mode, the number N is determined by at least one of the following configurations or any combination thereof:

random access channel preamble format;

random access slot configuration; and a length of a random access signal.

In an implementation mode, the step in which the first configuration module 21 may be configured to semi-statically configure the internal structure of the random access slot through the broadcast channel includes one of the steps described below.

The association relationship between every synchronization signal block or reference signal in the synchronization burst set and the respective corresponding first random access slot is the same.

Each of the synchronization signal blocks or reference signals in the synchronization burst set has an association relationship respectively configured.

In an implementation mode, the first configuration module 21 is further configured to configure each of the random access slots for providing one or more frequency domain resources as random access time-frequency resources.

In an implementation mode, the first configuration module 21 is further configured to determine the association relationship between the downlink synchronization signal block or the reference signal and the first random access slot in the time domain as that: the association relationship between the downlink synchronization signal block or the reference signal and the first random access slot is related to an index of the downlink synchronization signal block or the reference signal in the time domain.

Another device for indicating a random access physical resource includes a processor and a memory. The memory is configured to store computer-executable instructions which, when executed by the processor, implement the method described below.

An internal structure of a random access slot is semi-statically configured through a broadcast channel.

A terminal is notified of an association relationship between a downlink synchronization signal block or a reference signal and a first random access slot through a system message.

The device for indicating a random access physical resource in the embodiment may implement all details of the method in the embodiment. The description related to the method may be referred to. In practical application, the device for indicating a random access physical resource in the embodiment may implement the above-mentioned functions and the method of the embodiment by being configured on a base station, a transmission-reception point or other similar devices, or the device for indicating a random access physical resource in the embodiment may directly be the base station, the transmission-reception point or other similar devices. In practical application, the first configuration module 21 and the first notification module 22 may respectively be implemented by software, hardware, or a combination thereof. For example, the first configuration module 21 may be implemented by the base station, the transmission-reception point or other similar devices, and the first notification module 22 may be implemented by a communications unit of the base station, the transmission-reception point or other similar devices. For another example, the first configuration module 21 may be implemented by a processor of the base station, the transmission-reception point or another similar device, and the first notification module 22 may be implemented by a combination of a communications unit and the processor of the base station, the transmission-reception point or other similar devices. No limitation thereto is made herein.

Embodiment 2

Figure 3:
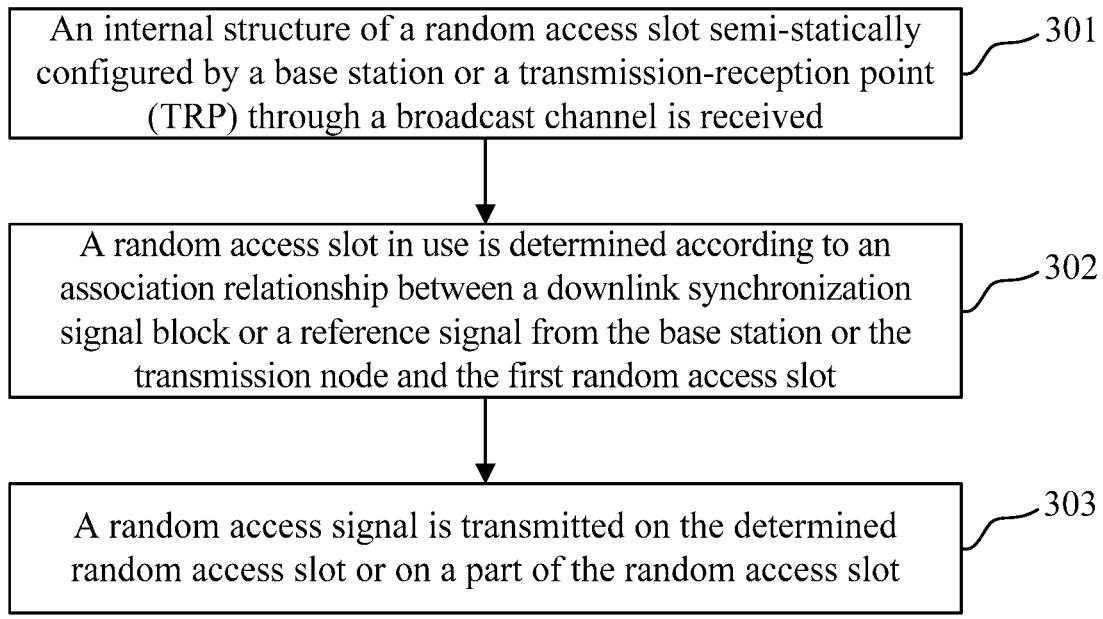
FIG. 3 is a flowchart of a method for indicating a random access physical resource according to an embodiment 2 of the present invention.

As shown in FIG. 3, a method for indicating a random access physical resource is provided and may include the steps described below.

In a step 301, an internal structure of a random access slot semi-statically configured by a base station or a transmission-reception point (TRP) through a broadcast channel is received. The internal structure of the random access slot may be used for determining the type of an association relationship between a downlink synchronization signal block or a reference signal and a first random access slot, such as, an association relationship between the downlink synchronization signal block and the first random access slot which may be the same as or be different from an association relationship between the reference signal and the first random access slot.

In a step 302, a random access slot in use is determined according to an association relationship between a downlink synchronization signal block or a reference signal from the base station or the transmission-reception point and the first random access slot. In the step 302, the random access slot in use is determined according to the configured internal structure of the random access slot.

In a step 303, a random access signal is transmitted on the determined random access slot or on a part of the random access slot.

In practical application, a plurality of random access slots may be involved in the association relationship between the downlink synchronization signal block or the reference signal and the random access slot, and N random access slots may be provided (as described in Embodiment 1). The first random access slot in the embodiment represents the first slot of the plurality of random access slots, and the random access slots may be fully expressed by the starting point plus the number. Optionally, the number N may be separately notified, and the first random access slot may also be separately notified.

In an implementation mode, the internal structure of the random access slot at least includes one of:

a ratio of a downlink part to an uplink part in the random access slot;

the number of symbols occupied by random access of the uplink part in the random access slot; and a time length of a random access physical resource of the uplink part in the random access slot; and the number of RACH occasions for the uplink part in the random access slot.

In an implementation mode, the internal structure of the random access slot may satisfy one of the conditions described below.

The downlink part is dominant in the random access slot.

The uplink part is dominant in the random access slot.

In an implementation mode, in the time domain, the association relationship between the downlink synchronization signal block and the first random access slot is that: the k-th random access slot after the downlink synchronization signal block or the reference signal is the first random access slot, where k is a positive integer. At this time, the step in which the random access signal is transmitted on the determined random access slot or on a part of the random access slot may include: transmitting the random access signal by taking the first random access slot or randomly selecting any random access slot after the first random access slot as the starting position.

In an implementation mode, the step in which the random access signal is transmitted on the determined random access slot or on a part of the random access slot may include: selecting N random access slots to transmit the random access signal, where N is an integer greater than or equal to 1 or a fraction greater than 0 and less than 1.

In an implementation mode, the number N is determined by at least one of the following configurations or any combination thereof:

random access channel preamble format;
random access slot configuration; and
a length of a random access signal.

In an implementation mode, the step in which the random access signal is transmitted on the determined random access slot or on a part of the random access slot may include that the starting position of the random access signal in the random access slot is determined by the index number of the downlink synchronization signal block or the reference signal and the number N.

In an implementation mode, the method may further include: selecting one or more frequency domain resources as random access time-frequency resources in each of the random access slots, so that the random access signal is transmitted on the random access time-frequency resources.

In an implementation mode, the step in which the random access signal is transmitted on the determined random access slot or on a part of the random access slot may include: determining a frequency domain resource or a frequency domain position in a manner of frequency domain randomization when the random access signal is transmitted.

In an implementation mode, the association relationship between the downlink synchronization signal block or the reference signal and the first random access slot is related to an index of the downlink synchronization signal block or the reference signal in the time domain. At this time, the step in which the random access signal is transmitted on the determined random access slot or on a part of the random access slot may include: transmitting the random access signal by taking the first random access slot or randomly selecting any random access slot after the first random access slot as the starting position.

The above-mentioned method of the embodiment may be implemented through a terminal or other similar devices.

Figure 4:
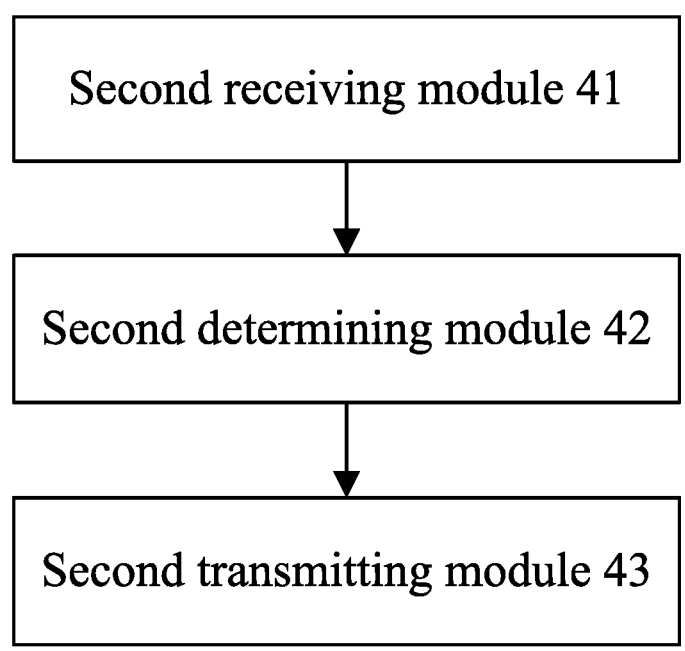
FIG. 4 is a structural diagram of a device for indicating a random access physical resource according to the embodiment 2 of the present invention.

As shown in FIG. 4, a device for indicating a random access physical resource is provided and may include a second receiving module 41, a second determining module 42 and a second transmitting module 43.

The second receiving module 41 is configured to receive an internal structure of a random access slot semi-statically configured by a base station or a transmission-reception point (TRP) through a broadcast channel.

The second determining module 42 is configured to determine a random access slot in use according to an association relationship between a downlink synchronization signal block or a reference signal from the base station or the transmission-reception point and a first random access slot.

The second transmitting module 43 is configured to transmit a random access signal on the determined random access slot or on a part of the random access slot.

In an implementation mode, the internal structure of the random access slot at least includes one of:

a ratio of a downlink part to an uplink part in the random access slot;

the number of symbols occupied by random access in the random access slot;

a time length of a random access physical resource in the random access slot; and the number of RACH occasions for the uplink part in the random access slot.

In an implementation mode, the internal structure of the random access slot satisfies one of the conditions described below.

The downlink part is dominant in the random access slot.

The uplink part is dominant in the random access slot.

In an implementation mode, in the time domain, the association relationship between the downlink synchronization signal block or the reference signal and the first random access slot may be that: the k-th random access slot after the downlink synchronization signal block or the reference signal is the first random access slot, where k is a positive integer. At this time, the second transmitting module 43 may be specifically used for transmitting the random access signal by taking the first random access slot or randomly selecting any random access slot after the first random access slot as the starting position.

In an implementation mode, the second transmitting module 43 may be configured to select N random access slots to transmit the random access signal. N is an integer greater than or equal to 1 or a fraction greater than 0 and less than 1. In an implementation mode, the number N is determined by at least one of the following configurations or any combination thereof: random access channel preamble format; random access slot configuration; and a length of a random access signal.

In an implementation mode, the second transmitting module 43 may further be configured to determine a starting position of the random access signal in the random access slot through the index number of the downlink synchronization signal block or the reference signal and the number N.

In an implementation mode, the second determining module 42 may further be configured to select one or more frequency domain resources as random access time-frequency resources in each of the random access slots, so that the random access signal is transmitted on the random access time-frequency resources.

In an implementation mode, the second transmitting module 43 may further be configured to determine a frequency domain resource or a frequency domain position in a manner of frequency domain randomization when the random access signal is transmitted.

In an implementation mode, the association relationship between the downlink synchronization signal block or the reference signal and the first random access slot is related to an index of the downlink synchronization signal block or the reference signal in the time domain. At this time, the second transmitting module 43 may be specifically used for transmitting the random access signal by taking the first random access slot or randomly selecting any random access slot after the first random access slot as the starting position.

Another device for indicating a random access physical resource includes a processor and a memory. The memory is configured to store computer-executable instructions which, when executed by the processor, implement the method described below.

An internal structure of a random access slot semi-statically configured by a base station or a transmission-reception point (TRP) through a broadcast channel is received.

A random access slot in use is determined according to an association relationship between a downlink synchronization signal block or a reference signal from the base station or the transmission-reception point and a first random access slot.

A random access signal is transmitted on the determined random access slot or on a part of the random access slot.

The device for indicating a random access physical resource in the embodiment may implement all details of the method in the embodiment. The description related to the method may be referred to. In practical application, the device for indicating a random access physical resource in the embodiment may implement the above-mentioned functions and the method of the embodiment by being configured on a terminal or other similar devices, or the device for indicating a random access physical resource in the embodiment may directly be the terminal or other similar devices.

In practical application, the second receiving module 41, the second determining module 42, and the second transmitting module 43 may respectively be implemented by software, hardware, or a combination thereof. For example, the second determining module 42 may be implemented by the terminal or other similar devices. The second receiving module 41 and the second transmitting module 43 may be implemented by a communications unit of the terminal or other similar devices. For another example, the second determining module 42 may be implemented by a processor of the terminal or other similar devices. The second receiving module 41 and the second transmitting module 43 may be implemented by a combination of a communications unit and the processor of the terminal or another similar device. No limitation thereto is made herein.

Embodiment 3

An embodiment provides a method for indicating a random access physical resource. The process is described below.

An internal structure of a random access slot is semi-statically configured by a base station or a TRP through a broadcast channel.

A terminal receives the internal structure of the random access slot semi-statically configured by the base station or the TRP through the broadcast channel.

The base station or the TRP notifies the terminal of an association relationship between a downlink synchronization signal block or a reference signal and a first random access slot through a system message.

The terminal determines a random access slot according to the quality of the received downlink signal or channel and the association relationship between the downlink synchronization signal block or the reference signal and the first random access slot.

The terminal transmits a random access signal on the determined random access slot or on a part of the random access slot.

For the specific implementation process of the embodiment, reference may be made to Embodiment 1 and Embodiment 2. Reference may be made to Embodiment 1 and Embodiment 2 described above.

To solve the problem of how the base station obtains the information of the downlink transmission beam selected by the terminal, it is necessary to consider establishing an association relationship between the initial downlink signal or channel received by the terminal and the random access physical resource. These common signals may be various types of synchronization signals. The common channel may be a broadcast channel, a channel carrying common control information, a channel carrying a common traffic, or the like.

Figure 5:
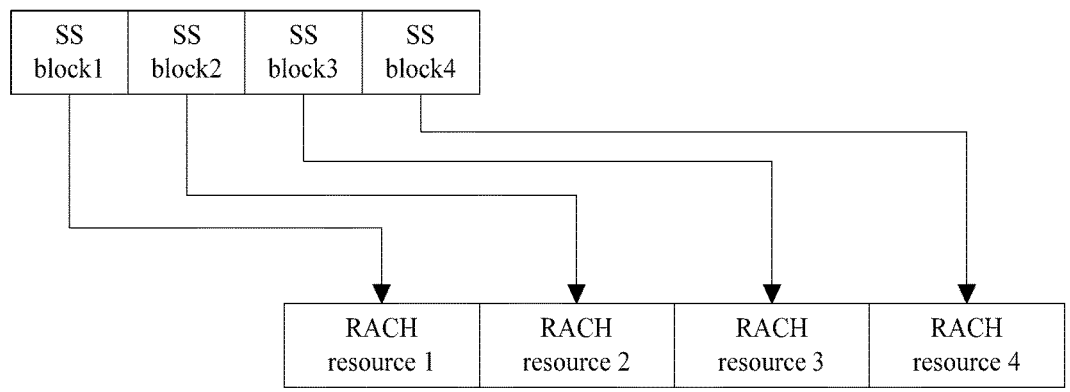
FIG. 5 is a diagram illustrating a corresponding relationship between a synchronization signal block and a random access physical resource subset according to an embodiment of the present invention.

The simplest corresponding relationship is to establish a corresponding relationship of a one-to-one mapping between the downlink signal or channel and a subset of a random access physical resource pool. As shown in FIG. 5, for example, a certain block of resource carrying the above-mentioned common signal or channel is referred to as a synchronization signal block (SS block). The SS block is merely a possible name, and does not limit the functional features of the carried corresponding downlink signal or channel. Each SS block corresponds to at least one downlink signal or channel in a specific beam direction or from an antenna port. The SS block has a one-to-one corresponding relationship with a random access physical resource subset. For example, as shown in FIG. 5, a one-to-one correspondence exists between a downlink SS block 1 or a reference signal 1 and a RACH resource 1, a one-to-one correspondence exists between a downlink SS block 2 or a reference signal 2 and a RACH resource 2, a one-to-one correspondence exists between a downlink SS block 3 or a reference signal 3 and a RACH resource 3, and a one-to-one correspondence exists between a downlink SS block 4 or a reference signal 4 and a RACH resource 4.

Here, the one-to-one correspondence is a relatively simple corresponding relationship. The terminal needs to obtain such corresponding relationship for obtaining corresponding random access physical resources, and then determine the corresponding random access physical resource according to the selected downlink signal or channel.

Figure 6:
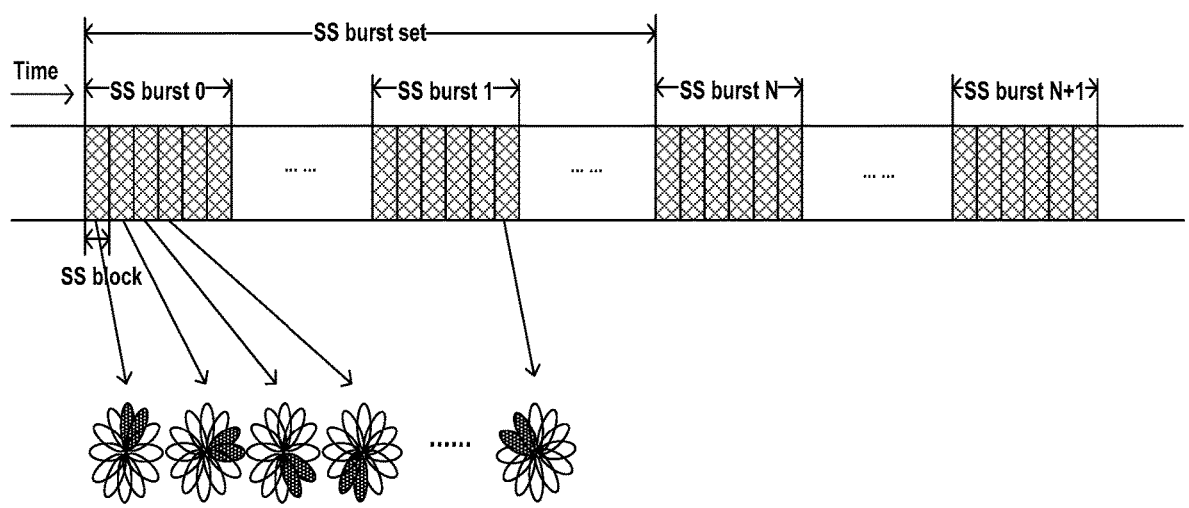
FIG. 6 is a diagram illustrating a synchronization signal burst set according to an embodiment of the present invention.

Optionally, the SS block of the base station is the minimum unit carrying the synchronization signal, and carries a synchronization signal in a beam direction or from an antenna port. A plurality of SS blocks are combined into a synchronization signal burst (SS burst) in the time domain, and a plurality of SS bursts are combined into a synchronization signal burst set (SS burst set) in the time domain. One SS burst set includes synchronization signals in all beam directions or from antenna ports, and the synchronization signals are repeatedly transmitted in a period of a SS burst set. An example of a SS burst set is shown in FIG. 6.

A random access channel (RACH) occasion is defined as a time-frequency resource used by a random access signal transmitted in a configured random access preamble format. The terminal receives the downlink signal or channel and detects the quality thereof to obtain quality information. For example, the strength of the received signal of the SS block is detected, a suitable SS block is selected according to the strength of the received signal, and the time-frequency resource used by the random access channel (RACH) occasion is determined by combining the corresponding relationship between the downlink signal or channel and the subset of the random access physical resource pool. The base station may indirectly know the SS block preferred by the terminal by receiving the random access signal.

The random access signal transmitted within the RACH occasion corresponds to all possible beam directions received in the uplink or to receive antenna ports. All receiving beam directions or receiving antenna ports are needed by the base station for detecting random access signals. In a scenario where the base station does not have the beam reciprocity, the terminal needs to repeatedly transmit the random access signal to ensure that the base station may obtain the preferred downlink transmit beam and the preferred uplink receive beam respectively by detecting the random access signal. In the scenario where the base station has beam reciprocity, the terminal may not need to repeatedly transmit the random access signal.

When the corresponding relationship between the downlink signal or channel and the subset of the random access physical resource pool is described, the representation of the resource occupied by the RACH occasion of the random access physical resource pool is a logical resource, and the logical resource ultimately needs to be embodied on the physical resource. Here, the physical resource for transmitting the random access signal is defined as a random access slot. In the new generation mobile communications system, a slot may be divided into a downlink slot and an uplink slot. The downlink slot or the uplink slot is not a simple downlink signal and a downlink channel or an uplink signal and an uplink channel, but refers to that the downlink signal and the downlink channel have a higher ratio in the downlink slot or the uplink signal and the uplink channel have a higher ratio in the uplink slot.

Figure 7:
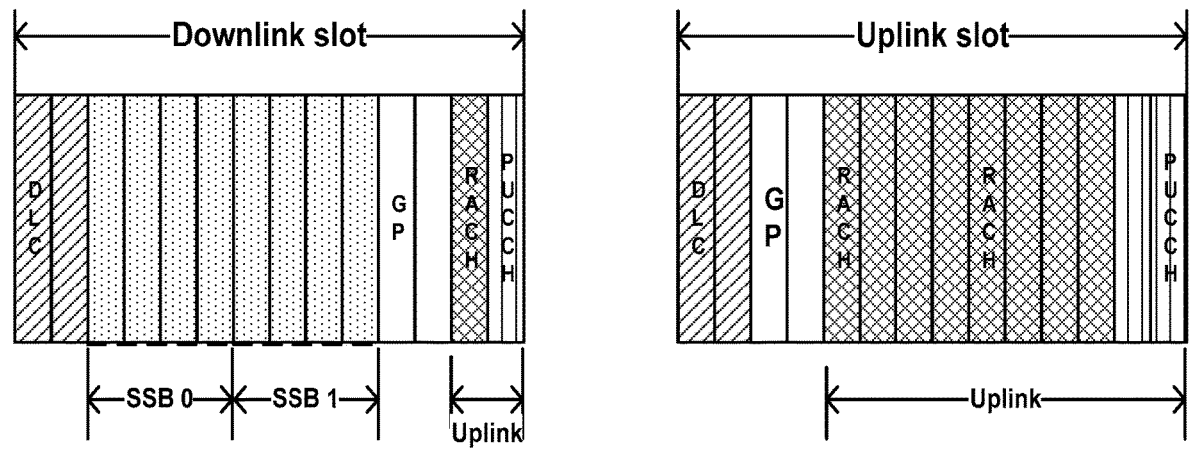
FIG. 7 is a diagram showing a slot according to an embodiment of the present invention.

An example of a slot including an uplink slot and a downlink slot is shown in FIG. 7. In the example shown in FIG. 7, the downlink slot is in a time division duplex (TDD) mode, and has 14 symbols, where the downlink control channel (DLC) and the synchronization signal block (SSB) occupy 10 symbols with a ratio of more than 50%, while the uplink signal RACH and the physical uplink control channel (PUCCH) occupy two symbols. In the example shown in FIG. 7, the uplink slot is in the TDD mode, and has 14 symbols, where the downlink control channel (DLC) occupies 2 symbols, and the uplink signal RACH and the PUCCH occupy 10 symbols with a ratio more than 50%.

Both the downlink slot and the uplink slot may be used to carry the uplink RACH signal, and the slot used to carry the random access signal is called a random access slot. The internal structures of the downlink slot and the uplink slot are not limited to the example of FIG. 7. Various configuration possibilities exist. That is, when the internal structure of the slot is dynamically adjusted, the interval sizes of different slots used to transmit the random access signal change dynamically. The granularity of the time change is at least one slot. When the change is the fastest, the number of resources provided by each different random access slot may be different. When the terminal searches for a physical resource for transmitting the RACH according to the association relationship between the downlink channel or the downlink channel (typically a SSB) and a certain subset of the random access physical resource pool (typically a RACH occasion), the downlink control information (DCI) in the downlink control channel in the slot needs to be read to obtain the RACH physical resource, so as to obtain the allocation of the RACH resources in the internal structure of the slot. Then the specific physical resource position is obtained through indirect calculation. If the DCI information is always read, it is very disadvantageous for reducing the power consumption of the terminal. Moreover, due to the dynamic change of the RACH resources in the random access slot, it is difficult to generally determine whether the random access physical resources in a SS burst set period are sufficient.

Before the type of the random access slot is reconfigured, the internal structure of the random access slot should remain unchanged. That is, the ratio of the internal downlink and uplink, the number of symbols occupied by random access, and the time length of the random access physical resource should remain unchanged. In terms of long-term parameters in units of days and months, the internal structure of the random access slot is preferably semi-static. Semi-static configuration may be implemented through the broadcast message. Multiple options may exist for a configuration set. The option may be a downlink slot, an uplink slot or the like. The configuration of the random access slot notified in the broadcast message may be marked with the index of the internal structure of the random access slot. The specific configuration is selected by the base station according to the random access preamble format that needs to be supported by the slot. In special cases, a semi-static configuration may become a completely static curing configuration.

The base station further needs to determine all random access slots available to the system. The density of the random access slot and the allocation position of the resource depend on various factors including: the random access preamble format to be adopted by the base station, the size of the random access area provided for an uplink transmission in the internal structure of the random access slot, whether the base station can receive a plurality of different beams in the frequency domain at the same time, whether the base station has the reciprocity of beam receiving and transmitting, and the like. The resources (sum of time, frequency, and code resources) of the RACH occasion provided by the random access slot in a SS burst set period need to meet at least the corresponding relationship with the downlink SS block or the reference signal.

From the perspective of the beam reciprocity of the base station, two examples are used below to respectively illustrate how to determine a physical resource for transmitting the RACH, i.e., a random access slot when an association relationship exists between a downlink signal or a downlink channel (typically a downlink SS block or a reference signal) and a subset of the random access physical resource pool (typically a RACH occasion).

Example 1

The example describes in detail the process of determining a physical resource, i.e., a random access slot, for transmitting the RACH, in the scenario where the base station has no beam reciprocity.

Figure 8:
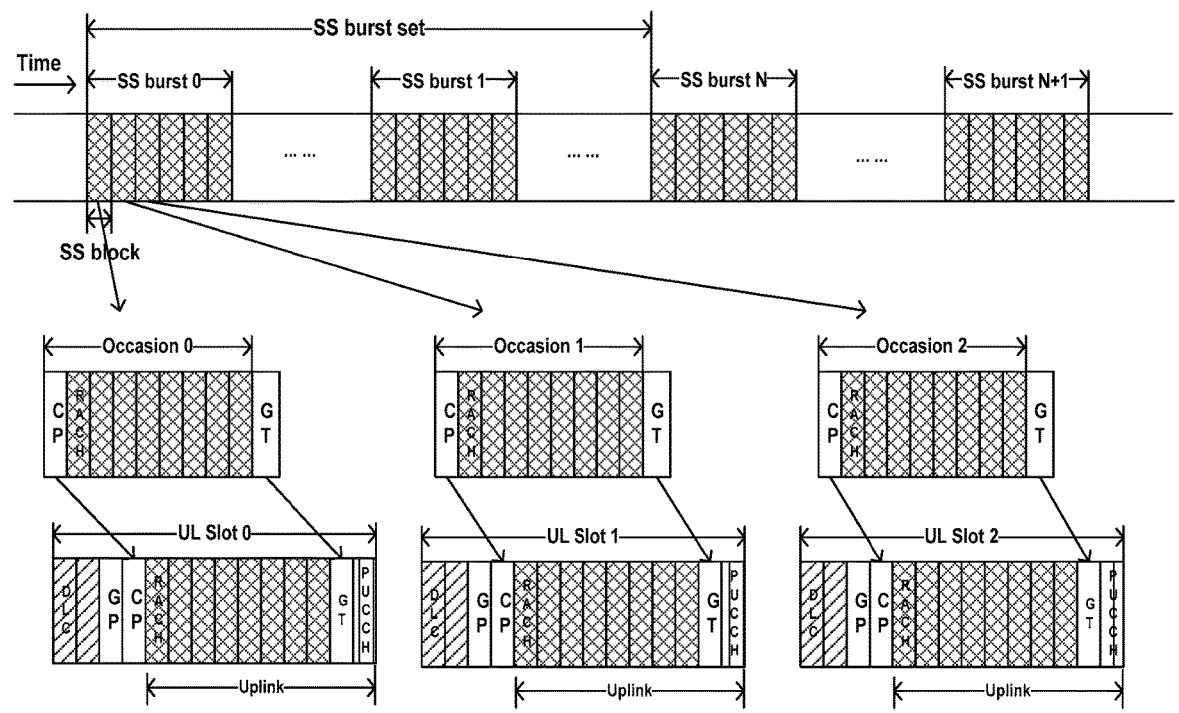
FIG. 8 is a schematic diagram showing a mapping relationship between a downlink synchronization signal block or reference signal, an occasion and a random access channel (RACH) slot according to an example 1 of an embodiment of the present invention.

FIG. 8 illustrates a mapping relationship between a downlink SS block or a reference signal, an occasion, and a RACH slot. Different SS blocks or reference signals correspond to different RACH occasions. An occasion is a logical resource number and needs to be mapped into a specific physical RACH slot. FIG. 8 is a typical configuration, that is, one SS block corresponds to one RACH occasion, and a logical resource of a RACH occasion may right be carried by a random access physical slot. 8 RACH symbols in the physical slot are taken as an example, indicating that the same random access symbol and sequence need to be repeated 8 times, so that the base station performs training and detection on 8 different receive beams. Here, a cyclic prefix (CP) of the random access signal and the guard period (GP) for differentiating slot downlink and uplink may share resources. A guard time (GT) of the random access signal and the PUCCH may share resources.

Figure 9:
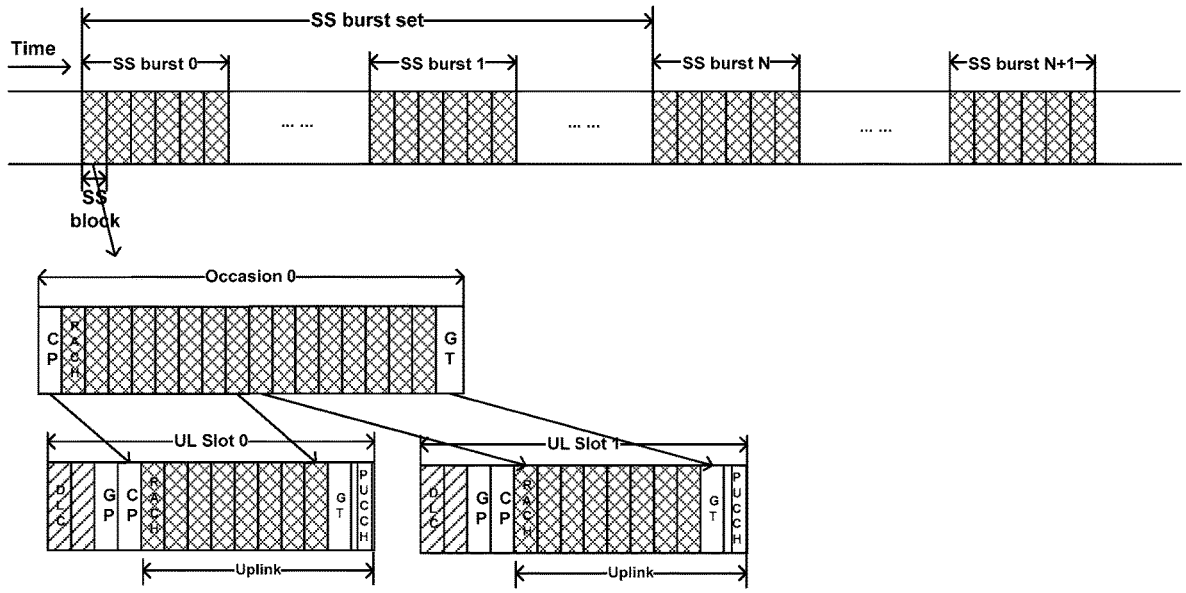
FIG. 9 is a schematic diagram showing another mapping relationship between a downlink synchronization signal block or reference signal, an occasion and a RACH slot according to the example 1 of the embodiment of the present invention.

FIG. 9 is a second typical configuration, that is, one downlink SS block or reference signal corresponds to one RACH occasion, and a logical resource of one RACH occasion may be carried by a plurality of, two in the example, random access physical slots. A total of 16 RACH symbols exist in two physical slots. The same random access symbol and sequence need to be repeated 16 times, so that the base station performs training and detection on 16 different receive beams. An uplink slot 1 and an uplink slot 2 may be continuously transmitted, or may be discontinuously transmitted. If a SS burst set period is long and contains more SS blocks, the corresponding RACH occasion is also longer, and more RACH physical slots are mapped.

Figure 10:
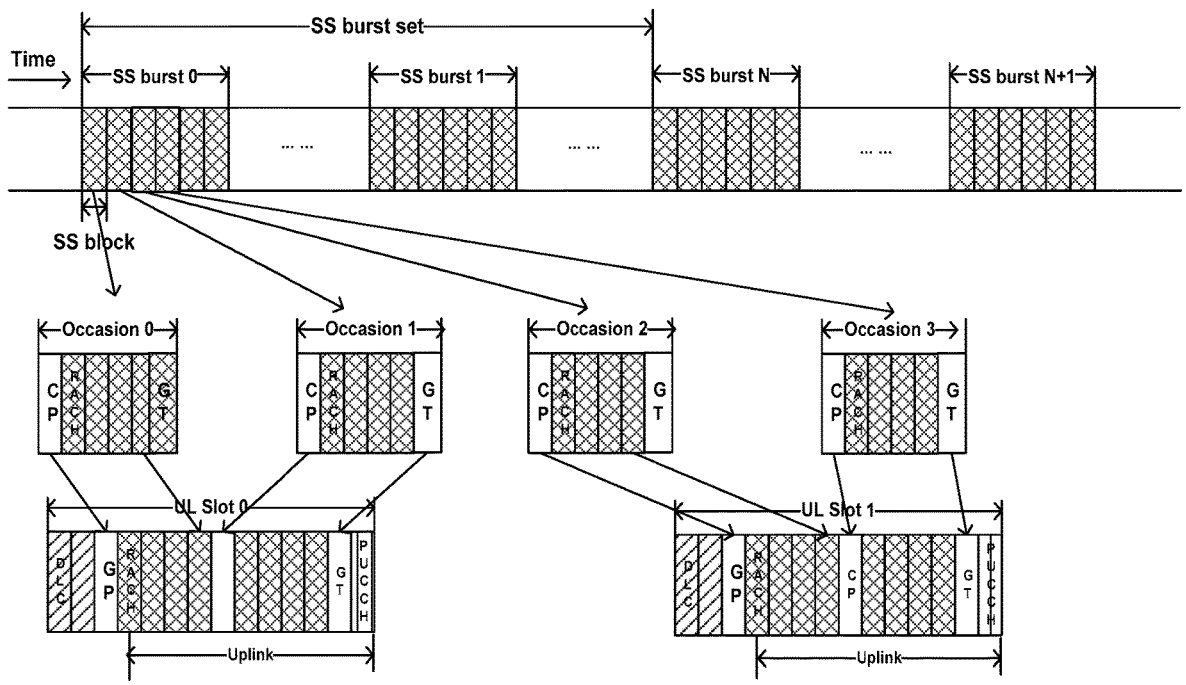
FIG. 10 is a schematic diagram showing another mapping relationship between a downlink synchronization signal block or reference signal, an occasion and a RACH slot according to the example 1 of the embodiment of the present invention.

FIG. 10 is a third typical configuration, that is, one downlink SS block or reference signal corresponds to one RACH occasion, and the logical resource of a plurality of occasions may be carried by one random access physical slot. A total of 8 RACH symbols exist in one physical slot. The same random access symbol and sequence of a same RACH occasion need to be repeated 4 times, so that the base station performs training and detection on 4 different receive beams.

Obviously, the above three typical mapping relationships may cover one-to-one, one-to-many, and many-to-one mapping relationships between RACH occasions and random access physical resources under the condition that the base station does not have beam reciprocity. The base station needs to at least notify the terminal SS block of the mapping relationship between the downlink SS block or the reference signal and the initial RACH slot. For example, a rank number of a RACH slot, after the downlink SS block or the reference signal, where the initial access may be performed is notified. In particular, in the case of a many-to-one relationship between the RACH occasion and the random access physical resource, a rank number of a slot in which the initial access may be performed need be notified, and a specific starting position in the slot need be determined. The specific starting position in the slot may be directly notified and, in addition, may be indirectly determined by the index number of the downlink SS block or the reference signal and the number of random access signals that can be carried in one physical slot.

The base station may further notify how many RACH slots may be mapped with one downlink SS block or reference signal, that is, how many RACH slots may be used by the random access signal corresponding to the downlink SS block or reference signal to transmit a random access signal. This number relationship is inversely related to the number of random access signals that may be carried in one RACH slot. The number of RACH slots here may not only be an integer greater than or equal to 1, but may also be a fraction greater than 0 and less than 1, such as 0.5, indicating that the random access signal may use only a half RACH slot, and such as 0.25, indicating that the random access signal may occupy only ¼ of the RACH slots. The number of RACH slots that may be used by the random access signal corresponding to the downlink SS block or the reference signal may also be indirectly calculated through the configured physical random access channel format and the length of the random access signal.

For all downlink SS blocks or reference signals in a SS burst set, the above single mapping relationship may be applied to all downlink SS blocks or reference signals. Each downlink SS block or reference signal may also be considered to have an independent mapping relationship. The configuration of the independent mapping relationship requires more signaling overhead. From the perspective of saving signaling overhead, a single mapping relationship is more advantageous for all downlink SS blocks or reference signals in a unified configuration. If the RACH resources that need to be mapped with each downlink SS block or reference signal are not uniform, the RACH resources required for each downlink SS block or reference signal may be added in the frequency domain or the code domain.

Example 2

The example describes in detail the process of determining a physical resource, i.e., a random access slot, for transmitting the RACH, in the scenario where the base station has beam reciprocity.

Figure 11:
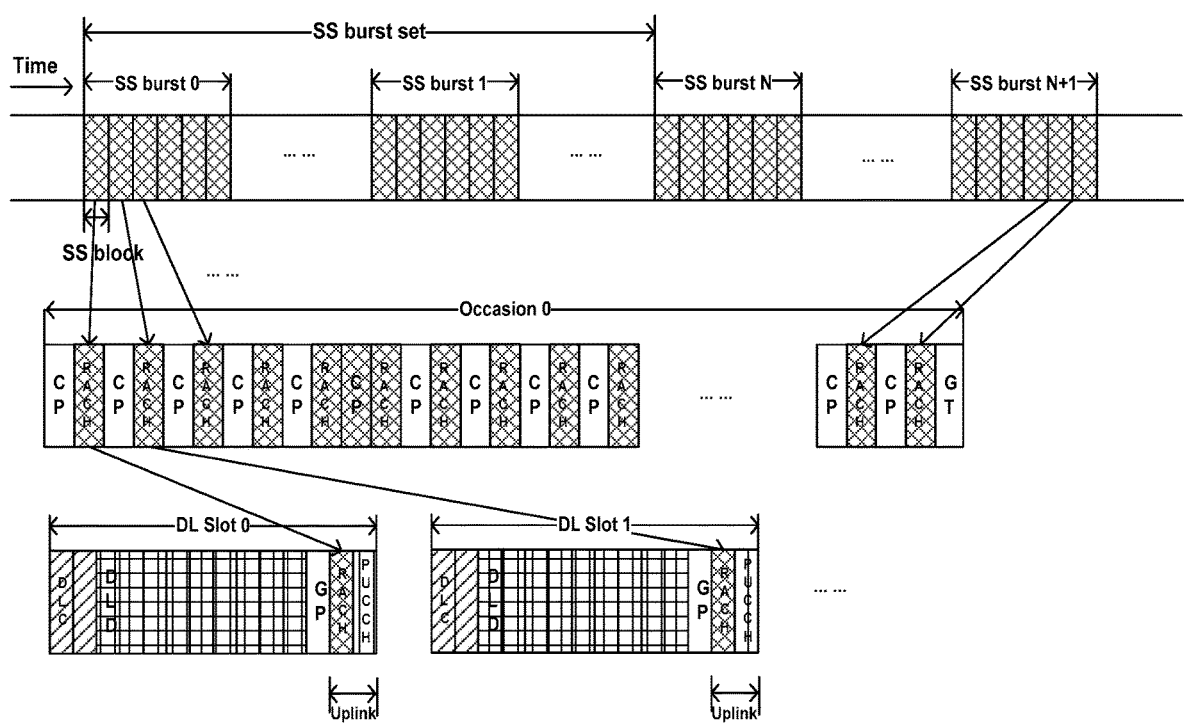
FIG. 11 is a schematic diagram showing a mapping relationship between a downlink synchronization signal block or reference signal, an occasion and a RACH slot according to an example 2 of an embodiment of the present invention.

When the base station has beam reciprocity, which is different from the scenario where the base station has no beam reciprocity, the random access symbol and sequence do not need to be repeated multiple times to meet the needs of scanning by the receive beam of the base station, while it is not excluded that the sequence or symbol is repeated for enhancing coverage. As described above, the random access signal transmitted within the RACH occasion corresponds to all possible beam directions received in the uplink or to receive antenna ports. When the beam has reciprocity, a representation form of the RACH occasion is different from that under the condition of no reciprocity. FIG. 11 illustrates a mapping relationship between a downlink SS block or a reference signal, an occasion, and a RACH slot. Different downlink SS blocks or reference signals in a same SS burst set correspond to one RACH occasion. An occasion is a logical resource number and needs to be mapped into a specific physical RACH slot. FIG. 11 is a typical configuration, that is, one downlink SS block or reference signal corresponds to a part of resources (corresponding to receive beams of the base station) of one RACH occasion, logical resources of one RACH occasion are carried by a plurality of random access physical slots, while a certain downlink SS block or reference signal corresponds to one of the plurality of random access physical slot.

Figure 12:
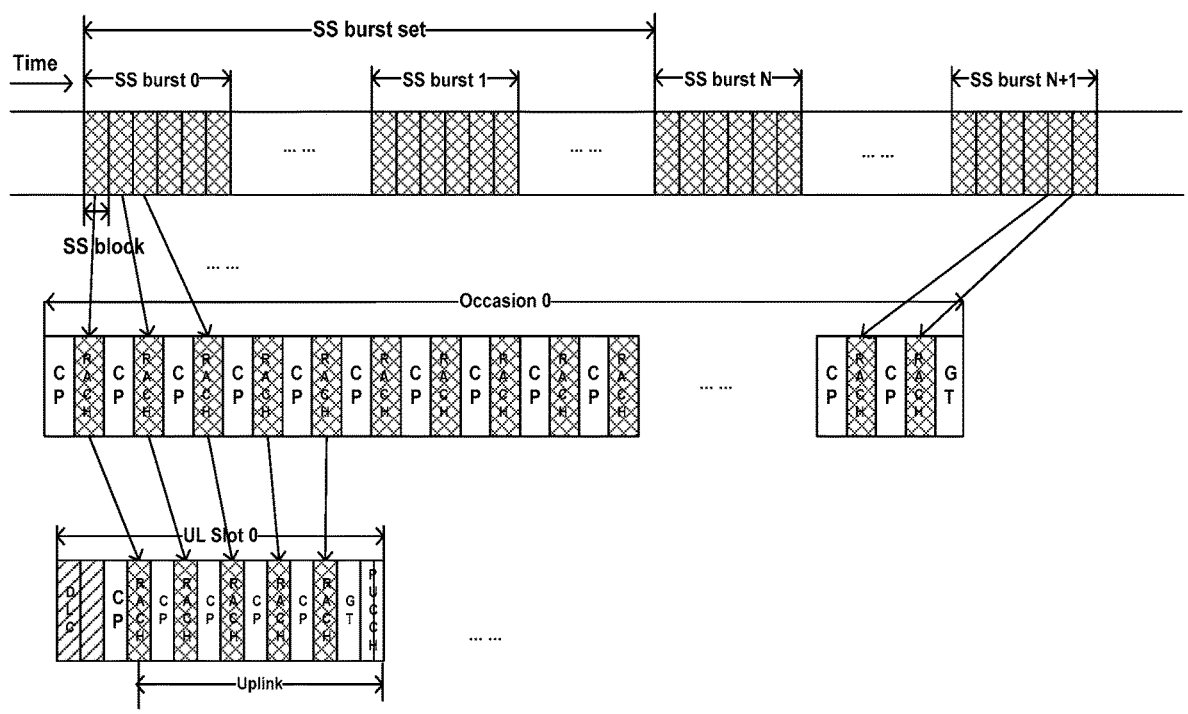
FIG. 12 is a schematic diagram showing another mapping relationship between a downlink synchronization signal block or reference signal, an occasion and a RACH slot according to the example 2 of the embodiment of the present invention.

FIG. 12 shows another possible typical configuration, that is, one downlink SS block or reference signal corresponds to a part of resources (corresponding to receive beams of the base station) of one RACH occasion, and logical resources of one RACH occasion are carried by a plurality of random access physical slots, while certain downlink SS blocks or reference signals correspond to one of the plurality of random access physical slots. That is, one random access physical slot is mapped to a plurality of downlink SS blocks or reference signals.

One downlink SS block or reference signal corresponding to a plurality of random access physical slots is also a possibility, similar to the configuration shown in FIG. 9 of Example 1, and will not be described again.

A certain commonality in the mapping relationship between the downlink SS block or the reference signal and the random access slot exists whether the base station has beam reciprocity or not.

Similarly, the base station needs to at least notify the terminal of the mapping relationship between the downlink SS block or the reference signal and the initial RACH slot. For example, a rank number of a RACH slot, after the downlink SS block or the reference signal, where the initial access may be performed is notified. In particular, in the case of a many-to-one relationship between the downlink SS block or the reference signal and the random access physical resource, a rank number of a slot in which the initial access may be performed need be notified, and a specific starting position in the slot need be determined. The specific starting position in the slot may be directly notified and, in addition, may be indirectly determined by the index number of the downlink SS block or the reference signal and the number of random access signals that can be carried in one physical slot.

The base station may further notify the terminal of the mapping relationship between the downlink SS block or the reference signal and the initial RACH slot in other implementation modes. For example, the association relationship between the downlink SS block or the reference signal and the initial RACH slot in the time domain is related to the index of the downlink SS block or the reference signal. In short, if the index of the downlink SS block or the reference signal is i, the RACH slot whose index is i or whose functional relationship is i is the associated initial RACH slot.

The base station may further notify how many RACH slots may be mapped with one downlink SS block or reference signal, that is, how many RACH slots may be used by the random access signal corresponding to the downlink SS block or reference signal to transmit a random access signal. This number relationship is inversely related to the number of random access signals that may be carried in one RACH slot. The number of RACH slots here may not only be an integer greater than or equal to 1, but may also be a fraction greater than 0 and less than 1, such as 0.5, indicating that the random access signal may use only a half RACH slot, and such as 0.25, indicating that the random access signal may occupy only ¼ of the RACH slots. The number of RACH slots that may be used by the random access signal corresponding to the downlink SS block or the reference signal may also be indirectly calculated through the configured physical random access channel format and the length of the random access signal.

For all downlink SS blocks or reference signals in a SS burst set, the above single mapping relationship may be applied to all downlink SS blocks or reference signals. Each downlink SS block or reference signal may also be considered to have an independent mapping relationship. More signaling overhead is needed for a configuration of independent mapping relationships (for example, the mapping relationship of a SS block 0 is k=4, the mapping relationship of a SS block 1 is k=3, and the mapping relationship of a SS block 2 is k=6, where k is not a uniform value). From the perspective of saving signaling overhead, a single mapping relationship is more advantageous for all downlink SS blocks or reference signals in a unified configuration. If the RACH resources that need to be mapped with each downlink SS block or reference signal are not uniform, the RACH resources required for each downlink SS block or reference signal may be added in the frequency domain or the code domain.

The above notification and indication methods apply not only to a single terminal user, but also to a multi-user scenario. If multiple users prefer the same downlink SS block or reference signal and initiate random access, interference with each other is avoided for the multiple users in a manner of frequency domain or code domain randomization. The frequency domain randomization is preferred, and the position of the frequency domain is determined by the terminal itself.

In addition, the present disclosure further provides a computer-readable storage medium storing computer-executable instructions which, when executed, implement any one of the above-mentioned methods for indicating a random access physical resource, such as implementing the method illustrated in FIG. 1 and/or FIG. 3.

Optionally, in the embodiment, the storage medium may include, but is not limited to, a USB flash drive, a read-only memory (ROM), a random access memory (RAM), a mobile hard disk, a magnetic disk, an optical disk or another medium capable of storing program codes.

Optionally, the storage medium is a non-transitory storage medium.

Optionally, in the embodiment, a processor executes the steps in the methods described in the above embodiments according to the program codes stored in the storage medium.

Optionally, for specific examples in the embodiment, reference may be made to the examples described in the above embodiments and optional implementation modes, and repetition will not be made in the embodiment.

It should be understood by those skilled in the art that all or some steps in the methods described above may be implemented by relevant hardware (such as a processor) as instructed by programs, and the programs may be stored in a computer-readable storage medium, such as a read-only memory, a magnetic disk, an optical disk or the like. Optionally, all or some steps in the embodiments described above may also be implemented by using one or more integrated circuits. Accordingly, the various modules/units in the embodiments described above may be implemented by hardware. For example, the functions of these modules/units may be implemented by one or more integrated circuits. These modules/units may also be implemented in the form of software function modules. For example, the functions of these modules/units may be implemented by using a processor to execute programs/instructions stored in a memory. Embodiments of the present disclosure are not limited to any specific combination of hardware and software.

The above illustrate and describe the basic principles, main features and advantages of the present disclosure. The present disclosure is not limited to the above embodiments. The above embodiments and specification describe only the principles of the present disclosure. Various modifications and improvements may be made in the present disclosure without departing from the spirit and scope of the present disclosure. These modifications and improvements are within the scope of the present disclosure.

INDUSTRIAL APPLICABILITY

In the present disclosure, the base station will configure an internal structure of the random access slot, and notify the terminal of the association relationship between the downlink SS block or the reference signal and the first random access slot through the system message according to the internal structure of the random access slot. Thus, after the corresponding downlink SS block or the reference signal is successfully detected by the terminal, the terminal initiates a random access request on the first random access slot according to the association relationship, and then the base station may know which beam may be used to successfully transmit information to the terminal. The problem that which beam used to transmit the information to the terminal cannot be determined is solved, and the success rate of transmitting information to the terminal by the base station is improved at the same time, which has positive industrial effect and characterizes simple implementation and good application prospects.

What is claimed is:

1. A method, comprising:
configuring an internal structure of one random access slot,
wherein the internal structure of the one random access slot comprises
a number of symbols occupied by random access of an uplink part in the one random access slot, and
a number of random access channel (RACH) occasions in the uplink part in the one random access slot, wherein the number of RACH occasions indicate a quantity of RACH occasions in the uplink part in the one random access slot; and
transmitting a parameter indicating the internal structure of the one random access slot and an association between a downlink synchronization signal block and the one random access slot.

2. The method of claim 1, wherein the internal structure of the one random access slot is configured according to a random access preamble format.

3. The method of claim 1, wherein the association between the downlink synchronization signal block and the one random access slot is transmitted via a system message.

4. The method of claim 1, wherein internal structure of the one random access slot is transmitted through a broadcast channel.

5. The method of claim 1, wherein the one random access slot is related to an index of the downlink synchronization signal block.

6. The method of claim 1, wherein the association between every downlink synchronization signal block and a corresponding random access slot is the same.

7. A device, comprising:
a processor configured to:
configure an internal structure of one random access slot,
wherein the internal structure of the one random access slot comprises a number of symbols occupied by random access of an uplink part in the one random access slot, and
a number of random access channel (RACH) occasions in the uplink part in the one random access slot, wherein the number of RACH occasions indicate a quantity of RACH occasions in the uplink part in the one random access slot; and
transmit a parameter indicating the internal structure of the one random access slot and an association between a downlink synchronization signal block and the one random access slot.

8. The device of claim 7, wherein the internal structure of the one random access slot is configured according to a random access preamble format.

9. The device of claim 7, wherein the association between the downlink synchronization signal block and the one random access slot is transmitted via a system message.

10. The device of claim 7, wherein internal structure of the one random access slot is transmitted through a broadcast channel.

11. The device of claim 7, wherein the one random access slot is related to an index of the downlink synchronization signal block.

12. The device of claim 7, wherein the association between every downlink synchronization signal block and a corresponding random access slot is the same.

13. A method, comprising:
receiving a parameter indicating an internal structure of one random access slot configured by a base station and an association between a downlink synchronization signal block and the one random access slot, wherein the internal structure of the one random access slot comprises:
a number of symbols occupied by random access of an uplink part in the one random access slot, and
a number of random access channel (RACH) occasions in the uplink part in the one random access slot, wherein the number of RACH occasions indicate a quantity of RACH occasions in the uplink part in the one random access slot;
determining the one random access slot according to the association between the downlink synchronization signal block and the one random access slot; and
transmitting a random access signal on the determined one random access slot.

14. The method of claim 13, wherein the association between the downlink synchronization signal block and the one random access slot is received via a system message.

15. The method of claim 13, wherein the one random access slot is related to an index of the downlink synchronization signal block.

16. The method of claim 13, wherein the association between every downlink synchronization signal block and a corresponding random access slot is the same.

17. The method of claim 13, wherein internal structure of the one random access slot is received via a broadcast channel.

18. A device, comprising:
a processor configured to:
receive a parameter indicating an internal structure of one random access slot configured by a base station and an association between a downlink synchronization signal block and the one random access slot, wherein the internal structure of the one random access slot comprises:
  a number of symbols occupied by random access of an uplink part in the one random access slot, and
  a number of random access channel (RACH) occasions in the uplink part in the one random access slot, wherein the number of RACH occasions indicate a quantity of RACH occasions in the uplink part in the one random access slot;
determine the one random access slot according to the association between the downlink synchronization signal block and the one random access slot; and
transmit a random access signal on the determined one random access slot.

19. The device of claim 18, wherein the association between the downlink synchronization signal block and the one random access slot is received via a system message.

20. The device of claim 18, wherein the one random access slot is related to an index of the downlink synchronization signal block.

21. The device of claim 18, wherein the association between every downlink synchronization signal block and a corresponding random access slot is the same.

22. The device of claim 18, wherein internal structure of the one random access slot is received via a broadcast channel.

* * * * *